United States Patent [19]

Tabata et al.

[11] Patent Number: 4,716,404

[45] Date of Patent: Dec. 29, 1987

[54] IMAGE RETRIEVAL METHOD AND APPARATUS USING ANNOTATIONS AS GUIDANCE INFORMATION

[75] Inventors: Kuniaki Tabata, Tokyo; Susumu Tsuhara, Sagamihara, both of Japan

[73] Assignee: Hitachi, Ltd., Tokyo, Japan

[21] Appl. No.: 594,690

[22] Filed: Mar. 29, 1984

[30] Foreign Application Priority Data

Apr. 1, 1983 [JP] Japan .................................. 58-55073

[51] Int. Cl.$^4$ .............................................. G09G 1/00
[52] U.S. Cl. ...................................... 340/723; 340/721; 340/995; 364/521
[58] Field of Search .............. 340/721, 723, 724, 734, 340/995; 364/518, 521

[56] References Cited

U.S. PATENT DOCUMENTS

| | | | |
|---|---|---|---|
| 4,312,577 | 1/1982 | Fitzgerald | 340/995 X |
| 4,400,727 | 8/1983 | Aron | 340/995 |
| 4,408,301 | 10/1983 | Iida | 340/724 X |
| 4,484,192 | 11/1984 | Seitz et al. | 340/721 X |
| 4,511,973 | 4/1985 | Miura et al. | 340/995 X |
| 4,527,155 | 7/1985 | Yamaki et al. | 340/72 X |
| 4,528,552 | 7/1985 | Moriyama et al. | 340/995 X |
| 4,533,910 | 8/1985 | Sukonick et al. | 340/721 |
| 4,542,376 | 9/1985 | Bass et al. | 340/721 |
| 4,543,572 | 9/1985 | Tanaka et al. | 340/721 X |
| 4,598,284 | 7/1986 | Ikegami et al. | 340/734 X |

FOREIGN PATENT DOCUMENTS 0051218  5/1982  European Pat. Off. .
2711759  9/1978  Fed. Rep. of Germany .

Primary Examiner—Gerald L. Brigance
Assistant Examiner—Jeffery A. Brier
Attorney, Agent, or Firm—Antonelli, Terry & Wands

[57] ABSTRACT

Image retrieval method and apparatus wherein for retrieval of a plurality of images, a sub-image of each image is specified and extracted, reference data such as memo data related to each sub-image is stored, and the sub-image and the memo data related thereto are combined and outputted as desired, thereby simplifying the retrieval of the plurality of images. Specifically, a sub-image which is the most characteristic to each image is extracted and combined with a memo data to thereby provide a clear clue to the image extraction. The number of specified sub-images is freely increased without rewriting original image data stored in an image file and image retrievel is settled by using a memo image and a cutout sub-image both having a less amount of data than the entire image, so that applications to a storage medium which is not rewritable, for example, an optical disc can be ensured with high response image display.

8 Claims, 12 Drawing Figures

FIG. 4

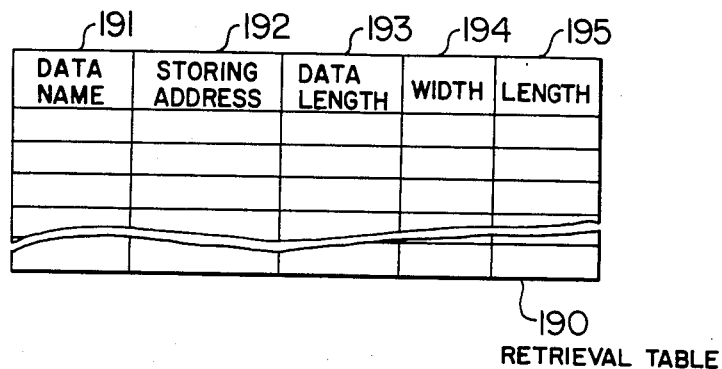

RETRIEVAL TABLE

FIG. 5

| COMMAND | FUNCTION |
|---|---|
| INPUT | INPUT IMAGE DATA AND STORE THE DATA IN IMAGE FILE |
| FIND | READ IMAGE DATA OF SPECIFIED NAME FROM IMAGE FILE AND DISPLAY THE READ OUT IMAGE DATA ON IMAGE DISPLAY |
| MEMO | SPECIFY A CUTOUT SUB-IMAGE IN RESPECT OF IMAGE DATA DISPLAYED ON IMAGE DISPLAY AND INPUT MEMO DATA |
| LIST | READ ALL DATA ON MEMO FILE AND EDIT THE READ OUT DATA IN LOOK UP TABLE FOR DISPLAY ON IMAGE DISPLAY |
| ABSTRACT | DISPLAY CUTOUT PICTURE CONSISTING OF SPECIFIED MEMO DATA AND SUB-IMAGE |
| END | TERMINATE ALL PROCEDURES |

IMAGE RETRIEVAL METHOD AND APPARATUS USING ANNOTATIONS AS GUIDANCE INFORMATION

BACKGROUND OF THE INVENTION

1. FIELD OF THE INVENTION

The present invention relates to an image retrieval method and apparatus suitable for retrieving document image files.

2. DESCRIPTION OF THE PRIOR ART

Of conventional retrieval methods for image files, the two most fundamental methods may be noted, of which one is to directly specify data names to be retrieved and the other to select a desired image from candidate data displayed in accordance with a specified classification code (indicative of, for example, major or middle classification). Known as advanced retrieval methods are, for example, a map image data base related to topographic figures in a map (reference (1) below), a query by pictorial example (QPE) in which an image file is retrieved by using a pictorial example (reference (2)), a method utilizing graphical expression of information related to data to be retrieved (references (1) and (2)), a method in which correspondence is made to color suggested by association from data contents (reference (3)), and retrieval of a series of Chinese character patterns using feature parameters (reference (4)).

References (Japanese language)

(1) "Image Data Base under Advanced Research Directed to Practical Utilization", Nikkei Computer, May 31, 1982, pp 40–49.

(2) Japanese Patent Application Laid-open No. 57-109050 laid open July 7, 1982.

(3) Japanese Patent Application Laid-open No. 57-121767 laid open July 29, 1982.

(4) "Retrieval of a Series of Chinese Character Patterns Using Feature Parameters", by Ohta et al, the Institute of Electronics and Communication Engineers of Japan, Research section, paper No. IE 80-120, pp 91–98.

Incidentally, as apparent from experiences in everyday life, memo information added by a user to data in a file will give a significant clue or guidance to retrieving the file in the future. By experience, it is also easy to decide what data an original image is related to by referring to a specified sub-image (for example, a portrait on a customer card or a structural diagram of a specified portion of a device) of the original image. In some applications (for example, retrieval of a cutout of newspaper, an interleaf for a book, or a note designated by an underline or marked in red), contents are referred to by positively making the most of only a sub-image rather than the entire image. In the past, however, methods have not yet been available which make the most of memo information such as reference information and a sub-image in order to retrieve an image file, leading to inevitable impairment of operational efficiency.

SUMMARY OF THE INVENTION

An object of the present invention is to provide an image retrieval method and apparatus capable of having high retrieving efficiency using guidance information such as sub-images and attached memos.

An image retrieval method according to an aspect of the present invention comprises the steps of storing a plurality of images, storing a reference data group related to each of the plurality of images in association with each of the images, specifying the position and the configuration of a sub-image associated with each of the plurality of images extracting a desired reference data from the stored reference data group, cutting out the sub-image specified in position and configuration with respect to the image corresponding to the extracted reference data, merging the extracted reference data and the cutout sub-images, and retrieving the plurality of images on the basis of a merged result.

BRIEF DESCRIPTION OF THE DRAWINGS

FIG. 4 is a diagram showing a retrieval table format.

FIG. 5 is a representation showing a command look-up table.

DESCRIPTION OF THE PREFERRED EMBODIMENTS

Figure 1:
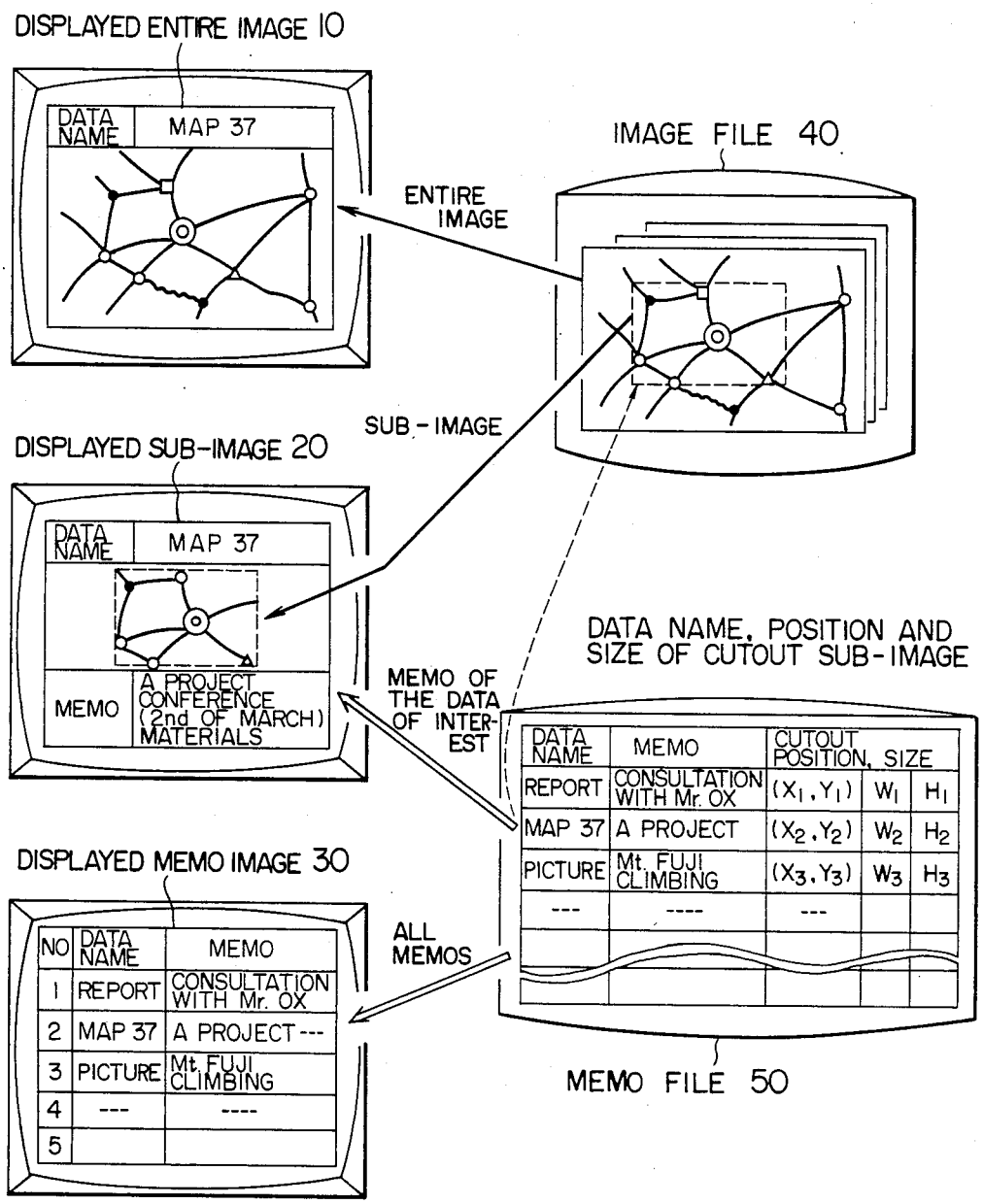
FIG. 1 is a diagrammatic representation useful in explaining the principle of the present invention.

Prior to describing the invention by way of example, the principle of the invention will first be described with reference to FIG. 1. In FIG. 1, an image file 40 stores image data from which a desired data is retrieved. A memorandum (memo) file 50 stores memo data and the position to cut out a sub-image and the size thereof in connection with each of a part or all of the image data stored in the image file 40. All the memo data stored in the memo file 50 can be edited into a look-up table form and displayed on a display screen as a memo image 30. Of the stored data in the memo file 50, a memo and a sub-image of a specified data can be merged or combined and displayed on the screen as a cutout sub-image 20. The sub-image to be displayed is cut out from the image data (entire image) stored in the image file 40 and its position to be cutout and size are stored in the memo file 50. The image data (entire image) in the image file 40 can be displayed on the screen as an entire image 10.

In this manner, according to the invention, retrieval of the image file can be simplified by making reference to the memo data and/or the sub-image of the original image data.

Figure 2:
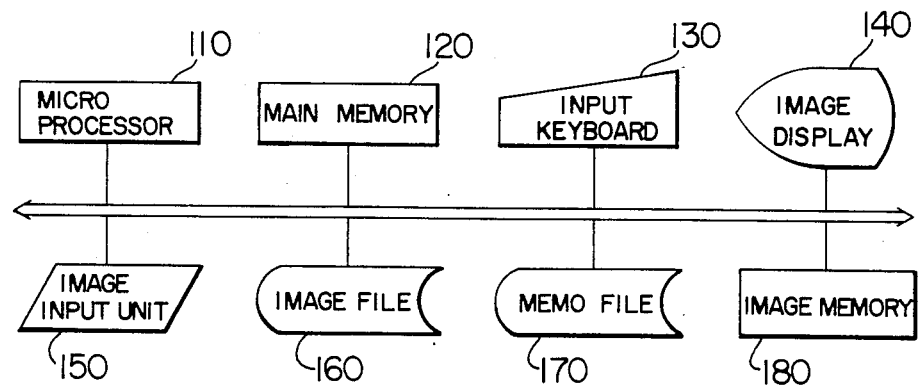
FIG. 2 is a block diagram showing a hardware construction of an image retrieval apparatus in accordance with an embodiment of the invention.
Figure 3:
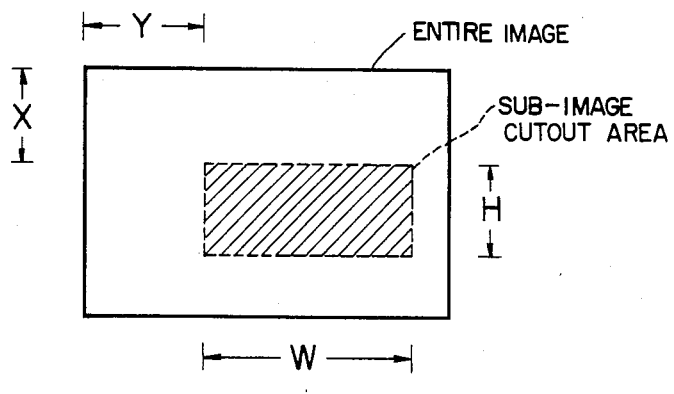
FIG. 3 is a diagram useful in explaining a cutout sub-image.

Next, the operational principle of the invention will be detailed with reference to FIG. 2 illustrating a hardware construction for implementing the present invention. In FIG. 2, there are illustrated a microprocessor 110, a main memory 120, an input keyboard 130, an image display 140, an image input unit 150, an image file 160, a memo file 170, and an image memory 180. The image file 160 is a file (40 in FIG. 1) for storage of image data, and image data to be stored is inputted from the image input unit 150. Part or all of the data stored in the image file 160 can be specified as a sub-image as described previously, and the position and size of the sub-image, respectively are defined by X-Y coordinates, a width W and a height H, as shown in FIG. 3. Values of X, Y, W and H and memo data are stored in the memo file 170 (50 in FIG. 1). A retrieval table 190 for controlling the image data in the image file 160 is stored in the main memory 120. As shown in FIG. 4, the retrieval table 190 stores, in connection with each of the data in the image file, a data name 191, a storing address 192 on the image file, a data length 193, and a width 194 and a length 195 of the image data. The image display 140 displays the memo picture 30, cutout sub-image 20 and entire-image 10 shown in FIG. 1. The image memory 180 is a work memory used for such processing as cutout of the sub-image and merging of the sub-image and the memo data. Commands and parameters for instructing such a processing as image retrieval are inputted from the input keyboard 130. The microprocessor 110 performs operational control for the respective components and a file retrieval processing, and programs and data, such as retrieval table 190 mentioned previously, to this end are stored in the main memory 120.

Figure 6:
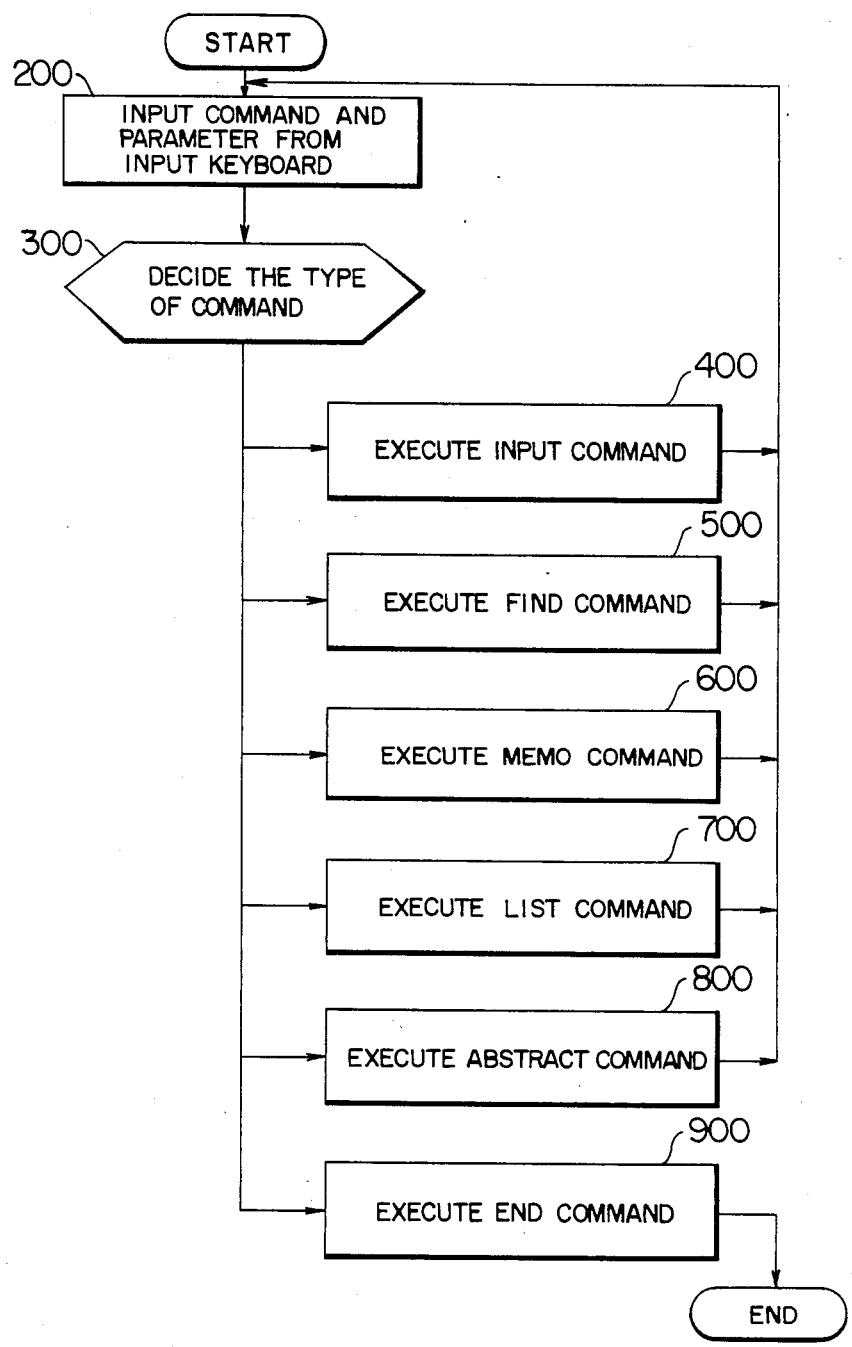
FIGS. 6 to 11 are flow charts showing retrieval proceedings or steps.

FIG. 5 shows the functions of the commands. Processings of the commands will now be described by referring to FIG. 6 which shows a processing flow by the microprocessor 110.

(1) Processing 200

Of the command shown in FIG. 5, a desired command and its parameter are inputted from the input keyboard.

(2) Processing 300

The input command is interpreted, and one of processings 400 to 900 is selected in accordance with the type of command.

Figure 7:
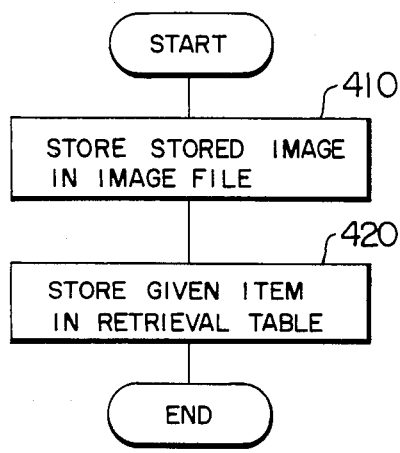

(3) Processing 400 (detailed in FIG. 7)

An INPUT command is executed according to the following procedures.

(a) An image data to be stored is read out of the image input unit 150 so as to be written into the image memory 180, and then stored into a vacant area of the image file 160 (step 410).

(b) A storing address on the image file 160, a data length of the image data, a data name specified by the input keyboard 130, and a width and a length of the image are stored in the retrieval table 190 (step 420).

(c) The procedure returns to the processing 200.

Figure 8:
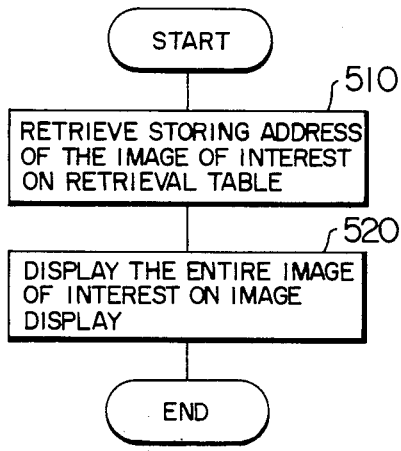

(4) Processing 500 (detailed in FIG. 8)

A FIND command is executed in accordance with the following procedures.

(a) By retrieving a data name specified by the input keyboard 130 on the retrieval table 190, a storing address of the image data is determined (step 510).

(b) The image data is read out of the image file 160 and the corresponding entire image is displayed on the image display 140. At this time, the displayed contents correspond to the entire image 10 (step 520).

(c) The procedure returns to the processing 200.

Figure 9:
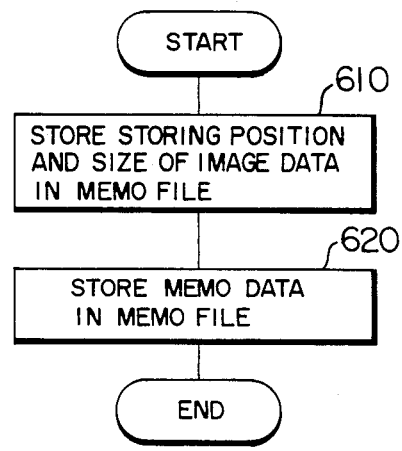

(5) Processing 600 (detailed in FIG. 9)

A MEMO command is accepted during the displaying of the entire image 10 on the image display 140 (namely, immediately after the FIND command), and serves to specify a cutout sub-image in respect of the image data being on display and input memo data. The MEMO command is executed in accordance with the following procedures.

(a) A cursor key on the input keyboard 130 is operated to specify a position (X, Y), a width W and a length H of the cutout sub-image in respect of the image data being on display. Values of X, Y, W and H together with a data name of the image being on display are stored in the memo file 50 (step 610).

(b) A memo data is inputted by the input keyboard 130 and stored in the memo file 50 (step 620).

(c) The procedure returns to the processing 200.

Figure 10:
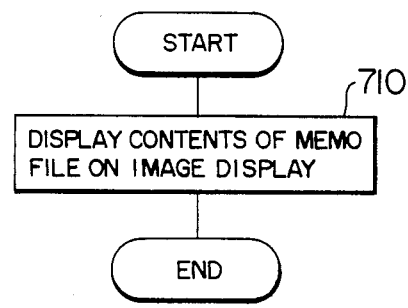

(b) Processing 700 (detailed in FIG. 10)

A LIST command serves to read all the data (but only data in the data name and memo data items) on the memo file and to edit the read out data in a look-up table form so as to be displayed on the image display 140. After completion of this processing, the procedure returns to the processing 200 (step 710).

Figure 11:
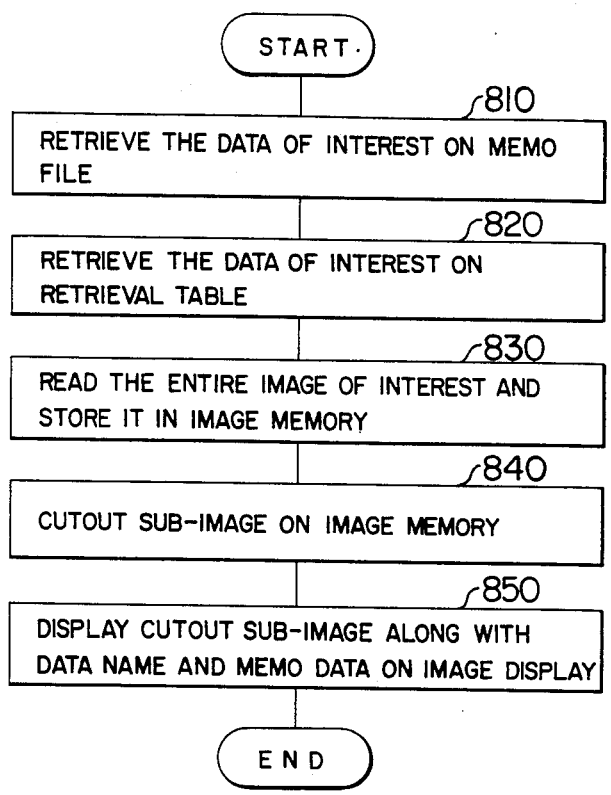

(7) Processing 800 (detailed in FIG. 11)

An ABSTRACT command serves to display the cutout sub-image picture 20 consisting of the specified memo data and sub-image. This command is executed in accordance with the following procedures.

(a) A data name of the image, a memo data and a position (X, Y), a width W and a length H of a cutout sub-image are read out of the memo file 50 and stored in the main memory 120 (step 810).

(b) By referring to the retrieval table 190, a storing address and a data length of the image data and a width and a length of the image are determined (step 820).

(c) The image data is read out of the image file 40 and stored in the image memory 180 (step 830).

(d) The sub-image defined by X, Y, W and H determined in (a) is cutout from the image data on the image memory 180 (step 840). This cutout processing is detailed in a Japanese Patent to the present assignee (Japanese Patent Publication No. 57-8499) and will be described in brief later.

(e) The data name of the image, the memo data and the sub-image cutout in (d) are displayed on the image display 140 (step 850).

(f) The procedure returns to the processing 200.

Figure 12:
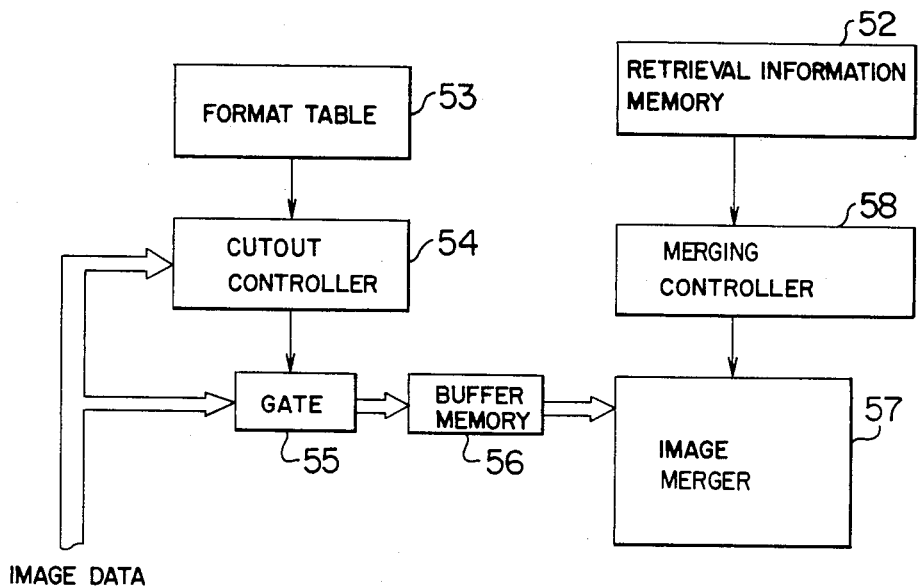
FIG. 12 is a block diagram showing a hardware construction for sub-image cutout.

FIG. 12 shows one embodiment of a hardware construction for cutout processing of the image data on the image memory 180. Referring to FIG. 12, a sub-image is cut out from an image data by means of a cutout controller 54. This image cutout is carried out on the basis of a signal from a format table 53. This table 53 stores data concerning the position and size of the cutout sub-image.

The cutout controller 54 receives the image data which is sent in the form of scanning data for the screen. Therefore, by counting the number of scanning lines and referring to the format table 53, the cutout controller 54 can detect the boundary of the cutout sub-image in units of a scanning line. The cutout controller 54 opens a gate 55 when detecting a start point of the cutout frame and closes the gate 55 upon detection of an end point. Consequently, only data of the sub-image is stored in a buffer memory 56.

The read out sub-image data is sent to an image merger or image combiner 57 to be merged with the sub-image data stored in the buffer memory 56, so that a new sub-image data is prepared. To carry out the image merging, a merger controller 58 refers to a retrieval information memory 52 to decide where of the original sub-image data the sub-image data in the buffer memory 56 is to be inset.

(8) Processing 900

An END command terminates all the procedures.

The present invention has been described by way of example but teachings thereof may be widely applicable to various systems and special-purpose processing apparatus. Specifically, the present invention may be applied purposely to a computer processing system, a unified arrangement comprising the image file 160, memo memory 170 and image memory 180 in FIG. 2, and a special-purpose processing processor in which the microprocessor 110, main memory 120 and file memories are unified.

In accordance with the embodiments of the present invention the following advantages are attained.

(1) Since, in addition to the image data (specifically, sub-image), the memo data is displayed on the image display, the information obtained from the memo data makes it easy to decide whether the image on the display screen corresponds to the intended data.

(2) For the cutout sub-image, the sub-image which has been preset in advance is cut out from the original image and displayed. Therefore, if a sub-image which is important and note worthy to the data retriever is preset in advance, image data of the preset sub-image can be displayed rapidly. Especially, where the entire image is not permitted to be displayed on one screen because of a restriction imposed by image resolution of an image display unit used, the conventional method requires that the screen scrolling be repeated to retrieve an intended sub-image. In contrast, according to the present invention, the intended sub-image can be displayed rapidly (without necessity of the screen scrolling) if the sub-image is preset in advance.

(3) Position and size of the sub-image to be displayed as the cutout sub-image can be preset or modified without rewriting the original image data in the image file and the image data control information. Therefore, the present invention is valid even when a storage medium which is not physically rewritable, for example, an optical disc is used as the image file.

(4) An extremely great amount of image data is usually handled and the amount of data to be transferred from the image file to the image display is proportionally increased. However, according to the present invention, a less amount of data is required for the memo image and the cutout sub-image than for the entire image and therefore the response of picture display can be high. Thus, the entire image can be displayed after candidate data of the intended image data is selected by using the high response memo image and cutout sub-image, thereby reducing the time for retrieval.

We claim:

1. An image retrieval method using a display system comprising the steps of:
   (a) storing a plurality of images in first memory means;
   (b) designating a partial area defining a sub-image for each image stored in said first memory means;
   (c) storing extracting information representing the position of the designated partial area in a corresponding image, reference data associated with said image and image designating information in a second memory;
   (d) displaying a plurality of pairs of image designating information and reference data read out of said second memory means for image retrieval;
   (e) selecting one of the image designating information by referring to the displayed reference data;
   (f) reading out an image corresponding to the selected image designating information from said first memory means and extracting a sub-image from said read-out image on the basis of said extracting information corresponding to said image designating information;
   (g) displaying the extracted sub-image together with said reference data associated therewith; and
   (h) displaying an entire image corresponding to the selected image designating information.

2. An image retrieval method according to claim 1 wherein at least said plurality of images are stored in a storage medium which is not rewritable.

3. An image retrieval system comprising:
   first memory means for storing a plurality of images;
   first input means for inputting images to be added to said first memory means;
   display means for displaying said input images and for retrieving images read from said first memory means;
   second input means for inputting information designating the position of a partial area defining a sub-image in an image displayed in said display means;
   third input means for inputting operating commands, information for designating an image to be retrieved and memo data;
   second memory means for storing an auxiliary record including extracting information representing the position of the partial area designated by said second input means and the memo data inputted by said third input means, in a corresponding relation with image stored in said first memory means;
   extracting means for extracting from one image read from said first memory means, one partial area on the basis of extracting information asociated with one image in one auxiliary record read from said second memory means;
   combining means for combining said extracted partial area with the memo data of said read auxiliary record and providing the result of combination to said display means; and
   data processing means including (a) means for transferring the contents of a plurality of records including memo data read from said second memory means to said display means, in response to inputting of a first command from said third input means; (b) means for transferring one image read from said first memory means and extracting information associated with said one image in the record read from said second memory means to said extracting means and transferring the memo data in said record to said combining means, in response to inputting of a second command and image designating information from said third input means; and
   (c) means for transferring an image read from said first memory means to said display means in response to inputting of a third command from said third input means.

4. An image file retrieval method comprising the steps of:
   (a) storing a plurality of images in an image file and guidance information corresponding to said images in a guidance file, each of said guidance information including memo data for each of said plurality of images and position data for specifying the position of a sub-image to be extracted from each of said plurality of images;
   (b) displaying said guidance information on a display screen for designating a desired one of said plurality of images by referring to memo data corresponding to said respective images;
   (c) extracting a sub-image from the designated image on the basis of the position data included in a referred-to guidance information which corresponds to said designated image;

(d) combining memo data included in said referred-to guidance information with the extracted sub-image and displaying the combined image on said display screen to thereby provide a guidance image for the image to be retrieved.

5. An image retrieval method using a display system which includes display means for displaying images, an image file for storing a plurality of image data, input means for inputting image designating information for specifying image data to be outputted to said display means and operating commands and data processing means for reading image data specified by said image designating information from said image file and for outputting the read image data to said display means, said method comprising the steps of:
   (a) producing auxiliary records including image designating information for each image data, extracting data representing the position of a sub-image defining a partial area in said image data and memo data related to said image data with respect to all or some of the image data stored in said image file, and storing the records in a memo file;
   (b) in response to inputting of a first command from said input means, reading said pluralilty of auxiliary records from said memo file and outputting each image designating information to said display means in a corresponding relation with the memo data;
   (c) reading image data for image designating information from said image file in response to inputting of a second command and image designating information from said input means, extracting sub-image from said read image data on the basis of an extracting data in said auxiliary records including said image designating information, and outputting the read sub-image together with a memo data corresponding thereto to said display means; and
   (d) outputting an entire image corresponding to said sub-image to said display means in response to inputting of a third command from said input means.

6. A method according to claim 5, wherein the image designating information inputted from said input means together with said second command is selected among a plurality of image designating information outputted to said display means together with the memo data.

7. An image retrieval method using a display system which includes display means for displaying images, an image file for storing a plurality of images, input means for inputting image designating information for specifying an image to be outputted to said display means and operating commands, and data processing means for reading an image specified by said image designating information from said image file, and outputting the read image to said display means, said method comprising the steps of:
   (a) producing auxiliary records including image designating information for each image, extracting data representing the position of a sub-image defining a partial area in said image, and memo data related to said image with respect to all or some of said images stored in said image file, and storing the records in a memo file;
   (b) in response to inputting of a first command from said input means, reading said plurality of auxiliary records from said memo file and outputting the contents of the read auxiliary records to said display means;
   (c) reading an image from said image file in response to inputting of a second command and information to designate one of said displayed auxiliary records from said input means, extracting a sub-image from said read image on the basis of an extracting data included in said designated auxiliary record, and outputting the read sub-image together with a memo data corresponding thereto to said display means; and
   (d) outputting an entire image corresponding to said sub-image to said display means in response to inputting of a third command from said input means.

8. An image retrieval method using a display system provided with first memory for storing a plurality of images, and second memory means for storing a plurality of sets of reference data associated with said image, image designating information for designating said image, and extracting information for representing the position of a partial are a in said image, comprising the steps of:
   (a) displaying a plurality of pairs of image designating information and reference data read out of said second memory for image retrieval;
   (b) selecting one of the image designating information by referring to the displayed reference data;
   (c) reading out an image corresponding to the selected image designating information from said first memory means and extracting a sub-image from said read-out image on the basis of said extracting information corresponding to said image designating information; and
   (d) displaying the extracted sub-image to thereby provide a feature of the image to be retrieved.

* * * * *